United States Patent [19]
Gonzalez et al.

[11] Patent Number: 5,494,329
[45] Date of Patent: Feb. 27, 1996

[54] CANOPY ASSEMBLY FOR BICYCLE-MOUNTED CHILD CARRIERS AND THE LIKE

[76] Inventors: Jacqueline A. Gonzalez; Jimmy J. Gonzalez, both of 8155 E. Roosevelt, Scottsdale, Ariz. 85257

[21] Appl. No.: 229,652

[22] Filed: Apr. 19, 1994

[51] Int. Cl.⁶ .............................. A47C 7/66; A47C 29/00
[52] U.S. Cl. .................. 297/184.13; 297/184.15; 135/88.01
[58] Field of Search ................... 297/184.13, 184.14, 297/185.15; 135/88.01, 88.02, 88.03, 88.04, 88.13, 117; 285/240; 403/251, 205, 292, 295, 255

[56] References Cited

U.S. PATENT DOCUMENTS

| | | | |
|---|---|---|---|
| 3,330,575 | 7/1967 | Beudreau | 297/184.13 X |
| 3,767,233 | 10/1973 | Hodge | 403/292 X |
| 3,873,220 | 3/1975 | Kashiwabara | 403/292 X |
| 3,881,830 | 5/1975 | Kato et al. | 403/295 X |
| 3,883,257 | 5/1975 | Delafield | 403/295 X |
| 4,378,946 | 4/1983 | Voytko et al. | 297/184.13 X |
| 4,389,057 | 6/1983 | Richard, Jr. | 297/184.14 X |
| 4,579,385 | 4/1986 | Koenig | 297/184.13 X |
| 4,785,838 | 11/1988 | Negahdari | 297/184.13 X |
| 5,168,889 | 12/1992 | Diestel | 135/88.01 |
| 5,203,363 | 4/1993 | Kidwell et al. | 297/184.15 X |
| 5,261,756 | 11/1993 | Kohn | 403/292 X |
| 5,301,975 | 4/1994 | Rivera | 297/184.15 X |

FOREIGN PATENT DOCUMENTS 2838941  3/1980  Germany .......................... 297/184.14

Primary Examiner—Jose V. Chen
Assistant Examiner—Rodney B. White
Attorney, Agent, or Firm—Richard R. Mybeck; Peter B. Scull

[57] ABSTRACT

An all-weather canopy assembly for a mobile child carrier comprises a frame assembly including at least two flexible, elongated tubular side members connected to a cross member. The frame assembly is detachably secured to a child carrier by pliable retention structure and is covered with an adjustable nylon or other cloth fabric cover which is attached to the frame assembly with hook-and-loop fasteners and which is slidable thereupon to provide selective protection for a child seated in the carrier.

12 Claims, 1 Drawing Sheet

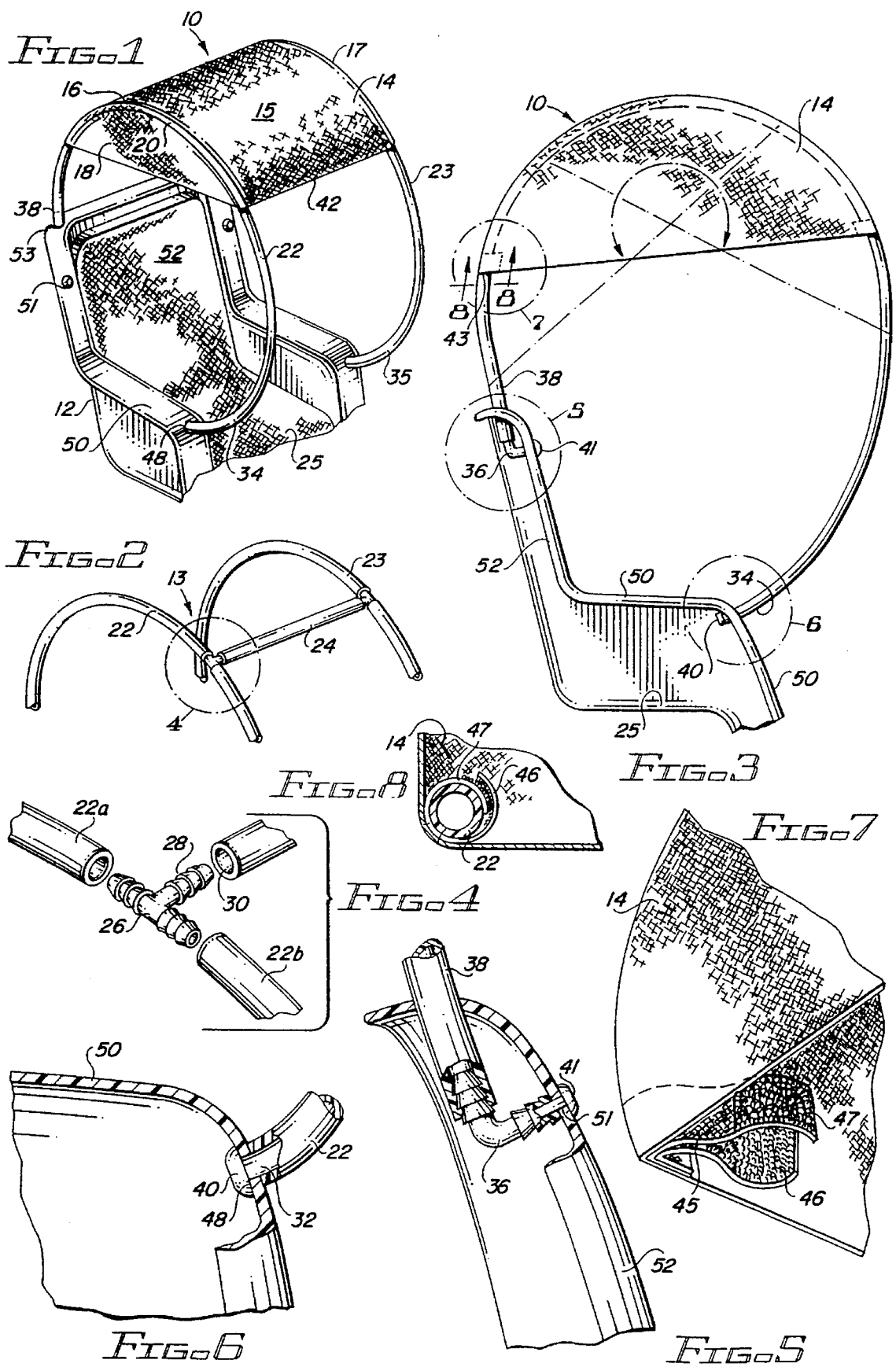

CANOPY ASSEMBLY FOR BICYCLE-MOUNTED CHILD CARRIERS AND THE LIKE

The present invention relates to canopies and sunshades in general and more particularly to an inexpensive and readily assembled, lightweight, flexible and adjustable all-weather canopy assembly which is quickly and removably attached to a child's bicycle seat or like child carrier.

BACKGROUND OF THE INVENTION

The dangers of exposing children to the weather elements, especially to ultraviolet rays emanating from the sun are well known. Many means currently exist for providing sun and/or weather protection for children in the form of canopy assemblies which are attachable to strollers or similar child carrier.

Among the prior art devices which attempted to provide sun and/or weather protection for children is Murphy (U.S. Pat. No. 1,039,993) which discloses a fairly elaborate canopy assembly for a baby carriage. Murphy's assembly has a bottom frame having adjustable side and cross bars which is positioned under the carriage. The assembly includes upwardly extending arm members which curve inwardly toward each other to overhang at the top of the carriage. These arm members are covered by mosquito netting or like material which is fitted to the supports yet is loose enough to allow for adjustment of the assembly.

Other prior art canopy assemblies utilized pivotally moveable frames that revolve about their side frame attachments. These include Wambach (U.S. Pat. No. 2,932,833) and Escobar (U.S. Pat. No. 3,241,160) who disclose stationary head rests with attached pivotal canopy assemblies, Bowden (U.S. Pat. No. 3,339,566) who discloses a canopy for attachment to automobile seats, Boggs (U.S. Pat. No. 3,840,161) who discloses an attachment for back-pack child carriers, and Gesslein (U.S. Pat. No. 3,929,372) who discloses a tiltable canopy which is pivotally mounted to a baby carriage.

Other prior art assemblies included pivotal resilient plastic canopies or sunscreens such as Anderson et al., (U.S. Pat. No. 4,027,915) who disclose a sun shade assembly which can be detachably secured to a child seat by means of pivot pins corresponding to cylindrical bosses attached to the seat. Brook (U.S. Pat. No. 4,030,748), Finn (U. S. Pat. No. 4,583,780), Beecher (U.S. Pat. No. 4,911,498), and James (U.S. Pat. No. 4,978,166) also teach assemblies which are pivotally attached at the sides of the particular child seat described therein.

Other fairly complicated protection devices include Pap et al. (U.S. Pat. No. 4,293,162) who teach a sun shade assembly for a child seat that comprises a cantilevered canopy formed of a suitable fabric or other material which is attached to a rigid metal frame which in turn is mounted on a tensioned ball joint member which allows for rotational adjustment of the frame. In this way, the canopy is adjustable vertically, horizontally and angularly with respect to the associated seat.

Voytko (U.S. Pat. No. 4,378,946) discloses a canopy assembly for attachment to a collapsible stroller in which the canopy frame is pivotally connected to the stroller handle. In use, the canopy is of limited value because it is not adjustable to multiple sun angles.

Myers (U.S. Pat. No. 4,583,779) teaches a canopy assembly for a child's car seat that is mounted to the car's interior. The assembly has a flexible sheet-like fabric cover which is generally horizontal when in use. A pocket formed in the rear of the assembly fits over the back of the car seat and the opposite end of the assembly is stretchably anchored to the car dash board. Hemispherical side panels extending along opposite sides of the fabric cover may be lowered to provide protection from side exposure or are raised out of the way. Nevertheless, this assembly is made for use within an automobile only.

Davis et al. (U.S. Pat. No. 4,733,906) also teaches a sun shade assembly for limited use with a child car seat. The assembly of Davis comprises a generally rectangular fabric shade supported by a generally U-shaped support bar. The bar is formed of a stiff but flexible, shape-restorable material, such as polyvinyl chloride, so that when placing the assembly over the child seat, its arms are flexed outwardly and the shape restorative force of the material causes the bar to draw back to contact or squeeze against the sides of the child seat. This squeezing force coacts with that of an elastic cord which is sewn along the back edge of the shade to pull the back edge inwardly against the back of the child seat, providing tension in the fabric to hold the front edge of the support bar in a generally horizontal position.

Purnell-Ayers (U.S. Pat. No. 4,784,433) and Franc (U.S. Pat. No. 5,007,679) both teach sunshade assemblies for child car seats that are formed of rubber or a like flexible material and use no rigid frames. The practical uses of these shades are limited to relatively non-mobile child carriers or those disposed within covered vehicles.

Smith (U.S. Pat. No. 4,997,231) discloses a sunshade assembly for a child carrier or car seat which includes a top cloth portion which extends from the carrier handle to the head of the carrier and a mesh portion on either side of the top cloth portion extending from the carrier handle to the carrier head. This assembly has no rigid frame and is only adaptable to child carriers having carrier handles strategically located to span the width of the child carrier. As such it is not usable on bicycle or like mounted child carriers.

Notwithstanding these prior achievements, in practice none of the prior art assemblies accomplished all of the ultimate desiderata for such an assembly because they taught either complex, heavy frame designs or flimsy, insubstantial assemblies not suitable for use with bicycle or like mounted child carriers. Further, none of them disclose a simple and inexpensive all-weather protection assembly which is also lightweight, durable (secure even in high wind), adjustable and relatively safe for child contact (no inflexible body contact or pinching due to convergence of moving frame members), and can be quickly and simply detachably attached to child carriers for use with uncovered vehicles such as bicycles and the like. It is to more effectively overcome these problems and to attain the totality of the aforestated desiderata that the present invention is directed.

BRIEF SUMMARY OF THE INVENTION

The present invention provides a new and unique all-weather canopy assembly for a bicycle mounted child carrier or the like which shields the child seated therein from the harmful effects of the sun, wind and rain. The assembly is lightweight, flexible, and is easily secured and removed from the carrier. Because of its flexibility and lack of moving frame members, the assembly poses little threat to a child who inadvertently bumps or touches the structure.

The all-weather canopy assembly comprises a lightweight, water-resistant nylon, net mesh or cloth fabric cover attached with "hook-and-loop", or VELCRO® type fasteners to a frame assembly which consists of two flexible, elongated tubular frame side members and a single cross member operatively interposed therebetween. The canopy assembly is simply attached to the backrest and side armrests of a preformed mountable child carrier by inserting the ends of the frame assembly through notches defined in the backrest and side armrests of the carrier and securing the ends in place with suitable retention grommets. When attached in this manner, the canopy assembly forms a curvilinear shape, the peak of the arc of which is suitably high above the child carrier.

In use, the fabric cover may be slidably or otherwise positioned along the frame side members to adjust to various incident angles of sun rays. High visibility (fluorescent or reflective) fabric and side panels are further optional features of the fabric cover of the present invention. The side panels may be permanently attached to the cover or may be constructed so as to be attached or removed as desired.

Accordingly, the primary object of the present invention is to provide an all-weather canopy assembly for a bicycle mounted or like child carrier which protects against the sun, wind and rain, is simply adjustable for multiple angles of radiation, is lightweight, and is easily and securely detachably attached.

A further object of the present invention is to provide an all-weather canopy assembly for a bicycle-mounted or like child carrier which is also simple to assemble and inexpensive to manufacture.

A still further object of the present invention is to provide a relatively safe weather canopy assembly for a bicycle mounted or like child carrier which comprises a lightweight, flexible frame assembly with no sharp edges or moveable frame members thereby providing a substantially reduced risk of harm should the child inadvertently contact the frame assembly during use.

These and still further objects as shall hereinafter appear are readily fulfilled by the present invention in a remarkably unexpected manner as will be readily discerned from the following detailed description of an exemplary embodiment thereof especially when read in conjunction with the accompanying drawings in which like parts bear like indicia throughout the several views.

DESCRIPTION OF THE DRAWINGS

In the drawings:

FIG. 1 is an isometric broken view of canopy assembly attached to a child carrier in accordance with the present invention;

FIG. 2 is a fragmented isometric view of the frame structure of the canopy assembly of FIG. 1;

FIG. 3 is a side elevation of a canopy assembly attached to a child carrier in accordance with the present invention;

FIG. 4 is an exploded view of region 4 in FIG. 2;

FIG. 5 is an enlarged view of region 5 in FIG. 3;

FIG. 6 is an enlarged view of region 6 in FIG. 3;

FIG. 7 is an enlarged view of region 7 in FIG. 3; and

FIG. 8 is a sectional view taken on line 8 of FIG. 3.

DESCRIPTION OF THE PREFERRED EMBODIMENTS

The present invention relates to a novel and unique all-weather canopy assembly for attachment to a preformed, bicycle mounted or like transportable child carrier in which the assembly is identified by the general reference 10 and the child carrier by 12.

Referring to the drawings, weather canopy assembly 10 is attached to a preformed child carrier 12 as shown in FIG. 1 and 3. Canopy assembly 10 comprises a frame assembly 13 and a fabric cover 14 which is attached to frame assembly 13, for relative movement thereupon as will be hereinafter described in detail.

As shown in FIG. 1, fabric cover 14 comprises a generally rectangular center portion 15 having a first longitudinal edge 16 and a second longitudinal edge 17 and two semi-circular side panels 18, one not shown, which are respectively sewn or otherwise attached along the arcuate edges 20, one not shown, thereof to edges 16, 17 of center portion 15, respectively.

In a preferred embodiment of the present invention, as shown particularly in FIG. 2, frame assembly 13 comprises two elongated flexible tubular side members 22 and 23, and a cross member Side members 22 and 23 are disposed in spaced generally parallel relationship to each other and cross member 24 is operatively interposed therebetween in generally perpendicular relationship to side members 22, 23 so that frame assembly 13, as shown in FIG. 2, resembles a capital letter "H" in plan. Side members 22 and 23 are of equal length and when installed on the child carrier 12 as shown in FIGS. 3, 5, and 6, define a curvilinear shape as shown in FIGS. 1 and 2, the peak of which is suitably spaced above the seat 25 of child carrier 12 to provide ample head room for the child borne therein. Cross member 24 substantially coincides in length to the width of child carrier 12 and enables frame assembly 13 to be readily installed on child carrier 12 in a manner to be hereinafter described.

Cover 14 is mounted upon frame assembly 13 and is slidable thereon to effectively block the sun's rays irrespective of the angle of incidence, as will hereinafter be described.

As shown in FIG. 2, frame assembly 13 is formed by interposing cross member 24 orthogonally between side members 22, 23, adjacent the peak of the arc defined by side members 22 and 23, and connecting it thereto. As shown in FIG. 4, one manner of accomplishing this is by cutting the side members, for example member 22, into two portions designated, "a" and "b" and then frictionally inserting a suitable connector such as a barbed tee joint 26, into the adjacent ends exposed by the cut to reinstate the integral nature of the side member 22. Side member 23 can be cut and reassembled in the identical manner. In the preferred embodiment, frame side members 22 and 23 are each cut into two portions of corresponding lengths and then barbed tee joints 26 and one not shown are frictionally inserted at these cut points to essentially reassemble side members 22, 23 into their previous continuous form having a barbed protrusion 28, extending inwardly therefrom in generally perpendicular relationship to the longitudinal axis of the associated side member 22, 23. Tubular cross member 24 has a first and second open end 30, 31, respectively, into which the corresponding protrusion 28, one not shown, is inserted to lock side members 22, 23, and cross member 24 into an integrated frame assembly 13.

In a preferred practice of the present invention, side members 22 and 23 and cross member 24 are made from a tubular plastic material such as polypropylene or like plastic tubing. The preferred diameter of the frame members is ⅜ inch outside diameter (O.D.), although other diameters could be used to provide different frame strengths for different embodiments. Tee joints 26 are preferably made from lightweight plastic or other suitable plastic tubing connection material and provided with barbed configurations, as shown in FIG. 4, on the extensions thereof. The preferred outside diameter of the tee joints 26 is ⅜ inch or other suitable size corresponding to the frame member sizes to assure secure frictional engagement of the tee joints 26 within side members 22 and 23 and cross member 24.

As shown in FIGS. 3 and 6, frame assembly 13 further comprises a pair of forward end connectors 32, for instance, each of which is telescopically inserted into the opening in the leading end 34, 35 of side members 22, 23 respectively. Similarly, as shown in FIGS. 3 and 5, a barbed elbow connector 36, (one not shown) is frictionally engaged into the trailing ends 38, 39 of side members 22, 23, respectively. As shown in FIGS. 3, 5, and 6, suitable detent means such as retention grommets 40 are detachably disposed on leading end connectors 32 after these connectors are inserted through child carrier 12 as described below. Similar retention means 41 are disposed on trailing elbow connectors 36 after these are telescopically inserted into child carrier 12. Retention means 40, 41 thus frictionally yet detachably engage end connectors 32, 36 to securely attach canopy assembly 10 to child carrier 12.

As with tee joints 26, forward end connectors 32 and rearward elbow connectors 36 are preferably formed of lightweight plastic or like material. In a preferred embodiment, connectors 32, 36 will be sized to correspond to the I.D. of side members 22, 23 to insure a secure frictional engagement between side members 22, 23 and the associated connectors 32, 36. The retention means 40, 41 are preferably made of rubber or like pliable, or elastic material and have an inside diameter somewhat smaller than the outside diameters of the connectors 32, 36, to which they are associated. The outside diameters of retention grommets 40, 41 are deliberately larger than the diameter of the corresponding openings pre-drilled in child carrier 12 so that unintentional detachment of frame assembly 13 from child carrier 12 is prevented.

Fabric cover 14, which comprises central portion 15 and like depending side panels 18 and one not shown, is preferably formed from a lightweight, water-resistant plastic fabric like nylon. Alternate embodiments may use net mesh, cloth or like fabric. Further, multiple color fabrics, including fluorescent and reflective materials, may be used.

Central portion 15 is generally rectangular and is substantially as wide as frame assembly 13. As shown in FIGS. 1 and 3, cover 14 extends lengthwise over and is suspended from frame side members 22, 23 in such a way that its length, that is between leading edge 42 and trailing edge 43 is sufficiently long to provide adequate shade or protection from the weather elements.

Fabric cover 14 is attached to frame assembly 13 in a manner to be described and is adjustable by sliding cover 14 along side members 22 and 23 along the arc of frame assembly 13. This adjustability can be tracked by referring to the plane passing through leading edge 42 and trailing edge 43. Thus, as will be described, this plane may be adjusted to a plurality of positions relative to horizontal and permits cover 14 to be moved to provide maximum protection by intercepting a plurality of incident angles of sun rays, wind or rain.

Side panels 18, one not shown, are generally semicircular in shape and depend from central portion 15 outboard of side members 22 and 23. In the preferred embodiment, side panels be, and one not shown, are integrally attached, as by sewing, to central portion 15. Although in an alternative embodiment, such side panels may be detachably attached as by zippers (not shown) to central portion 15, or may depend inboard of frame side members 22 and 23.

Referring to FIGS. 7 and 8, suitable means for the attachment of fabric cover 14 to frame side members 22 and 23 are provided by a plurality of mating hook-and-loop (VELCRO®) fasteners 45. As shown particularly in FIGS. 7 and 8, two pairs of mating hook-and-loop fasteners 45 are attached to the under side of cover 14 one each adjacent each corner of leading edge 42. Another two pairs 45 are similarly attached adjacent each corner of trailing edge 43. Each 45 is sewn, glued or otherwise attached at these respective points to top cover 14. In the preferred embodiment, at least four pairs of hook-and-loop fasteners will be attached to the under side of cover 14.

Fabric cover 14 is then secured to frame assembly 13 by placing fabric cover 14 upon frame side members 22 and 23 and then wrapping, for example, the hook mate 46 of hook-and-loop fastener 45 around the adjacent side member and fastening it to corresponding loop mate 47, as shown in FIGS. 7 and 8. The three other hook-and-loop fastener pairs are engaged around the respective frame side members in like manner.

In use, leading ends 34, 35 of side members 22, 23 are attached to child carrier 12, as shown in FIGS. 3 and 6 by passing side members 22, 23 through pre-drilled openings 48 defined in each armrest 50 of child carrier 12. As previously described, openings 48 have a diameter that is slightly larger than the diameter of forward connector 32 to allow ready insertion of forward connector 32. Thus, forward connector 32, after first being frictionally inserted in open end 30 of side member 22 as described above, is then inserted through opening 48. Finally, retention means 40 is frictionally pressed onto connectors 32. Side member 23 is similarly installed. As assembled, retention means 40 frictionally secures connector 32 and hence side member 22 and frame assembly 13 is securely attached to child carrier 12.

The trailing ends 38, 39 of side members 22, 23 are similarly attached to child carrier 12 as shown in FIG. 5. A pre-drilled opening 51 in the outer edge of backrest 52 is likewise provided with a diameter sufficient to allow slidable insertion of the corresponding elbow 36 therethrough. Retention means 41 are frictionally attached over the protruding end of elbow 36 to frictionally secure elbow 36 and thus side member 22, to the carrier 12. Though not shown in detail, side member 23 is attached to corresponding armrest and backrest locations on child carrier 12 as been described for side member 22. As shown in FIG. 1, a notch 53 may be formed in backrest 52 in such a position to provide each side members 22, with additional lateral support. A corresponding notch (not shown) similarly holds frame side member 23. Thus, canopy assembly 10 is now detachably secured to child carrier 12 and is ready for use.

From the foregoing, it is readily apparent that a useful embodiment of the present invention has been herein described and illustrated which fulfills all of the aforestated objectives in a remarkably unexpected fashion. It is of course understood that such modifications, alterations, and adaptations as may readily occur to the artisan confronted with this invention are intended within the spirit of this disclosure which is limited only by the scope of the claims appended hereto.

Accordingly, what is claimed is:

1. A combination child carrier-canopy assembly comprising a child carrier having integral armrests and a backrest formed therewith, each of said armrests having a discrete opening defined therethrough;

a frame assembly having a first and a second flexible, elongated side member disposed in generally parallel spaced relationship to each other, each said side member having a forward end and a rearward end, each said forward end extending through a different one of said discrete openings, armrest detent means operatively associated with each said forward end and sized to prevent the inadvertent withdrawal of said side member from said discrete opening, each said rearward end being detachably secured to said backrest; and a fabric cover, said fabric cover being detachably attached to each of said frame side members and adjustably supported thereby.

2. A canopy assembly according to claim 1 in which said frame assembly further comprises at least one cross member operatively disposed transversely of said frame side members and connected thereto to maintain said side members in fixed spaced relationship to each other.

3. A combination child carrier-canopy assembly according to claim 2 in which said frame assembly further comprises: said side members each having a first and a second section and a tee joint, each said tee joint being operatively associated between each said first and second section and having a protrusion extending perpendicularly therefrom for telescopic insertion into said cross member to secure said cross member to each of said side members.

4. A combination child carrier-canopy assembly according to claim 1 in which said backrest has a first and a second discrete opening defined therethrough for receiving a different one of said rearward ends of said side members in operative association therewith and connector means for securing said side members to said backrest.

5. A combination child carrier-canopy assembly according to claim 4 in which said connector means comprises an elbow connector having a first end and a second end extending orthogonally from said first end, said first end being telescopically inserted within said side member and said second end protruding through said discrete opening in said backrest, and backrest detent means insertable within each said rearward end for preventing the inadvertent withdrawal of said side member from within said discrete opening.

6. A combination child carrier-canopy assembly according to claim 5 in which each said backrest detent means has an outside diameter sized to frictionally engage an inside diameter of said side members.

7. A combination child carrier-canopy assembly according to claim 6 in which each said armrest and said backrest detent means has an inside diameter smaller than an outside diameter of said associated side members and is circumscribed thereabout.

8. A combination child carrier-canopy assembly according to claim 1 in which each said armrest detent means has an inside diameter smaller than an outside diameter of said associated frame side member.

9. A combination child carrier-canopy assembly according to claim 1 further comprising mating hook-and-loop fastener means for detachably securing said fabric cover to said side members and permitting axial movement therealong.

10. A combination child carrier-canopy assembly according to claim 9 in which said fabric cover comprises a rectangular central portion having corners and said mating hook-and-loop fastener means are attached to said central portion adjacent said corners thereof.

11. A combination child carrier-canopy assembly according to claim 10 in which said fabric cover further comprises side panels depending from said central portion.

12. A combination child carrier-canopy assembly adapted for detachable attachment to a bicycle mounted child carrier, said child carrier having integral armrests and a backrest formed therewith, comprising an axially slidable adjustable fabric cover, two elongated side members disported in spaced generally parallel relationship to each other, each said side members having a forward and rearward end, and a cross member operatively interposed between said side members to form an integrated frame assembly being detachably attachable to said child carrier by coaction of said forward ends of said side members with said armrests and coaction of said rearward ends of said side members with said backrest said fabric cover being secured between said side members in superposition to said cross member.

\* \* \* \* \*